Figure 1:
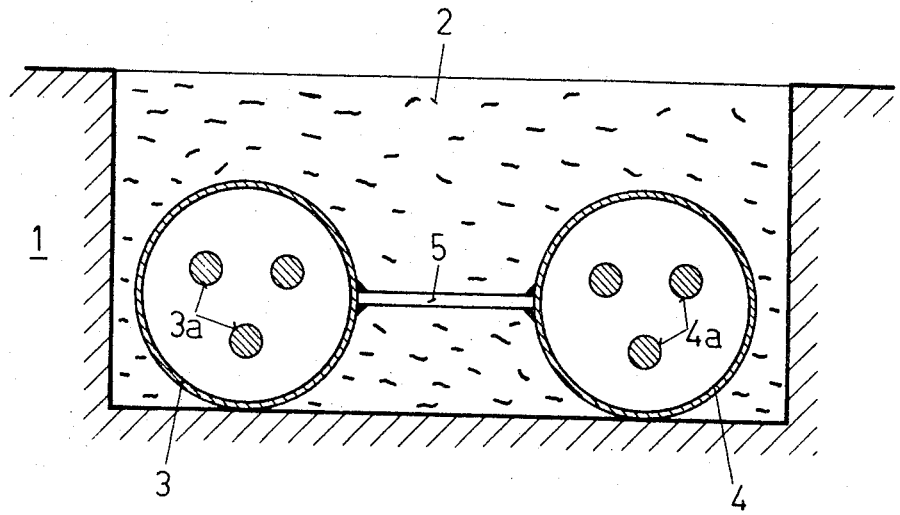

United States Patent [19]
Eidinger et al.

[11] 3,869,562
[45] Mar. 4, 1975

[54] DUAL UNDERGROUND CABLE SYSTEM FOR TRANSMITTING ELECTRICAL POWER

[75] Inventors: Adolf Eidinger, Nussbaumen; Carl-Dieter Floessel, Fislisbach, both of Switzerland

[73] Assignee: BBC Brown Boveri & Company Limited, Baden, Switzerland

[22] Filed: Feb. 5, 1974

[21] Appl. No.: 439,745

[30] Foreign Application Priority Data
Mar. 26, 1973 Switzerland.................... 4252/73

[52] U.S. Cl............... 174/15 C, 174/16 B, 174/27, 174/37
[51] Int. Cl..................... H01b 7/34, H01b 9/06
[58] Field of Search .................. 307/12, 13, 42, 147; 317/26, 122; 174/15 C, 16 B, 37, 27

[56] References Cited
UNITED STATES PATENTS

| | | | |
|---|---|---|---|
| 2,066,321 | 1/1937 | Bennett............................ | 174/15 C |
| 3,015,743 | 1/1962 | Skeats............................ | 307/147 |
| 3,406,245 | 10/1968 | Watkins........................... | 174/15 C |
| 3,409,731 | 11/1968 | Fink et al........................ | 174/15 C |
| 3,598,898 | 8/1971 | Turgeon........................... | 307/147 |
| 3,795,820 | 3/1974 | Eidinger.......................... | 307/147 |
| 3,798,346 | 3/1974 | Kreuzer........................... | 174/16 B X |
| 3,800,062 | 3/1974 | Kataoka........................... | 174/15 C |

FOREIGN PATENTS OR APPLICATIONS

| | | | |
|---|---|---|---|
| 1,389,838 | 1/1965 | France............................ | 174/15 C |
| 1,453,592 | 8/1966 | France............................ | 174/15 C |

*Primary Examiner*—Arthur T. Grimley
*Attorney, Agent, or Firm*—Pierce, Schaffler & Parker

[57] ABSTRACT

A dual system for electric power transmission laid underground comprises two three-phase compressed gas insulated transmission lines operating electrically in parallel each which is designed in the form of three symmetrically spaced phase conductors enclosed within a pressurized gas-filled metallic tube which serves to dissipate the heat losses into the surrounding earth. The metallic tubes of the two three-phase transmission lines are interconnected by heat-conductive metallic plates distributed along the length of the conductor installation whereby in the event of failure of one of the transmission line, the load carried by the other system can be increased substantially during the period of failure through utilization of the metallic tube of the failed lines for dissipation of a portion of the heat losses of the other lines remaining in operation.

5 Claims, 2 Drawing Figures

DUAL UNDERGROUND CABLE SYSTEM FOR TRANSMITTING ELECTRICAL POWER

The present invention relates to a dual system for electric power transmission which is laid underground, consisting of two three-phase compressed gas insulated transmission lines operating in parallel and designed in the form of three symmetrically spaced phase conductors operating within gas-filled tubes utilizing $SF_6$ as an insulation medium.

Parallel operating, dual systems are utilized for transmission of electric power over important routes for various reasons, such as the magnitude of power being transmitted, assurance of transmission etc. A great number of dual systems for high tension overhead lines have been placed in operation, where the dual line is suspended from supporting towers, used jointly by the dual lines. If one of these lines fails, there is generally no reasonable way to move over the remaining line more than one half of the power carried by the dual lines.

In the case of so-called "CGI" transmission lines, i.e., high tension lines with the phase conductors supported in spaced relation within pressurized gas-filled tubes, it is known to lay such lines underground, for example, directly into the earth. The capacity to carry current loads continuously, and thus the power transmission of such lines within gas-filled tubes, is limited primarily by the maximum amount of loss which can be transferred to the surrounding earth at a specific conductor or casing temperature. In this connection, the drying out of the earth plays an important role here, and extensive research had been conducted previously dealing with underground lines of conventional design, carrying heavy currents.

It is the principal object of the invention to provide a relatively simple and inexpensive solution for an underground dual system, using conductors in gas-filled tubes where in case of a failure by one half of the dual system, it becomes possible to increase very substantially the current-carrying capacity of the other half while the thermal dissipation to the surrounding earth will remain at a constant value.

This is accomplished in accordance with the invention in such manner that the encapsulating tubes are kept in thermal contact with each other by heat-conducting connecting pieces which are distributed throughout the length of the installation. It thus becomes possible to utilize in an advantageous manner the failing half of the system for the dissipation of the thermal loss into the surrounding earth, with the result that the operative system half can run at a transmission output factor of approximately 1.4 during the period of failure by the other half of the system.

Figure 2:
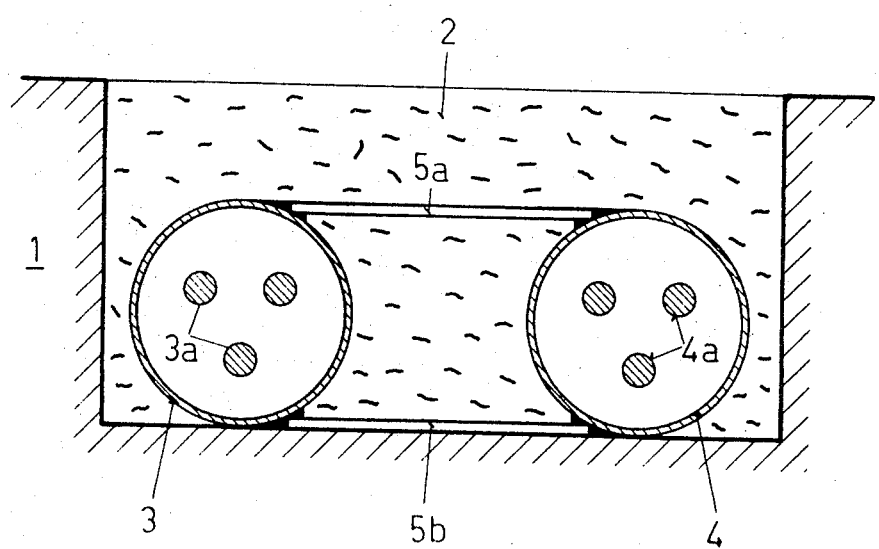

The accompanying drawings illustrate practical examples of the invention wherein:

FIG. 1 shows in cross-section dual three-phase current transmission systems arranged in gas-filled tubes which extend parallel with each other in spaced relation, and FIG. 2 is a similar view illustrating a modification of FIG. 1.

In both embodiments identical components are identified by identical reference numerals. A ditch is provided in the earth 1, into which are placed the two three-phase conductor groupings 3a, 4a in gas-filled tubes 3, 4. The phase conductors 3a, and 4a respectively, are supported in place spaced relation inside the gas-filled metallic tubes 3, or 4 respectively, in a manner known per se by means of insulators, which are not illustrated here. The interior of the parallel spaced tubes is filled with insulating gas, for example $SF_6$ at a pressure of 4 atmospheres. The metallic tubes 3, 4 are placed in good thermal contact with each other by means of interconnecting pieces 5. In the case of conductors for three-phase current in gas-filled tubes, as illustrated, it will be advantageous to use tubes 3, 4 made of steel, and the connecting pieces 5, in plate form, are made from steel also, possibly produced by casting. Each of the interconnecting pieces, viewed in the longitudinal direction of the conductors in gas-filled tubes, can have a length of approximately 3 meters, and these interconnecting pieces are provided throughout the length of the conductor installation most advantageously in such manner that the space between adjacent plates 5 will still permit the laying of the line and the installation of these connecting plates 5, i.e., welding on the plates 5 at the point of assembly. In the case of the embodiment shown by FIG. 1, the individual metal plates 5 are of minimum width since they are located at the points of minimum distance between the surface of tubes 3 and 4. In the case of the embodiment shown by FIG. 2 heat transfer between the tubes is improved by utilization of two metal plates 5a and 5b at each interconnection point along the line. In this case, plates 5a and 5b are welded to the tubes 3, 4 tangentially at the top and bottom. When the installation of the dual tubular encapsulated conductors is completed, the ditch within the earth 1 is back-filled with any suitable medium 2 in known manner, for example, with the earth removed previously.

Obviously, the invention is not limited to two three-phase conductor groupings each located in a common gas-filled tube, as shown by the drawing. In principle, it can be utilized also for a dual system where each half of the dual three-phase current supply system comprises three single-phase conductors, each phase being housed within its own gas-filled tube. In this case, the connecting parts 5, or 5a, 5b respectively, are to be placed between the encapsulating tubes of the corresponding phases of the two three-phase systems.

We claim:

1. A dual system for transmission of electrical power underground and which provides for dissipation of heat from each such system into the surrounding earth comprising two three-phase compressed-gas-insulated transmission lines extending in parallel spaced relation in the earth and which operate electrically in parallel, each said transmission line comprising three conductors encapsulated within at least one metallic tube filled with a compressed insulating gas and from which heat is dissipated into the earth, and metallic heat conductive members interconnecting said parallel spaced conductor encapsulating tubes and which extend longitudinally in a substantially continuous manner throughout the entire length of said dual power transmission lines whereby in case of a failure of one of said transmission lines the normal load carried by the other can be substantially increased due to the additional heat dissipating capacity provided by the encapsulating tube of the failed line.

2. A dual underground electrical power transmission system as defined in claim 1 wherein said heat conductive members which interconnect said parallel spaced conductor encapsulating tubes are constituted by longitudinally extending metallic plates located between said encapsulating tubes and which are welded thereto at their points of minimum distance from each other.

3. A dual underground electrical power transmission system as defined in claim 1 wherein said heat conductive members which interconnect said parallel spaced conductor encapsulating tubes are constituted by longitudinally extending metallic plates located between said encapsulating tubes and which are welded tangentially thereto at the tops and bottoms of the tubes.

4. A dual underground electrical power transmission system as defined in claim 1, wherein the individual phase conductors of each transmission line are encapsulated in a common metallic tube.

5. A dual underground electrical power transmission system as defined in claim 1, wherein the individual phase conductors of each transmission line are encapsulated in separate metallic tubes, and said interconnecting metallic heat conductive members extend respectively between the encapsulating tubes of corresponding phase conductors of the two transmission lines.

* * * * *